(12) United States Patent
Wang

(10) Patent No.: US 7,078,674 B2
(45) Date of Patent: Jul. 18, 2006

(54) OPTICAL PICKUP DEVICE EMITTING LINEAR POLARIZED LIGHT WITH A 45 DEGREE PHASE DIFFERENCE

(75) Inventor: Jinn-Kang Wang, Taipei (TW)

(73) Assignee: Acute Applied Technologies Inc. (TW)

( * ) Notice: Subject to any disclaimer, the term of this patent is extended or adjusted under 35 U.S.C. 154(b) by 116 days.

(21) Appl. No.: 10/751,458

(22) Filed: Jan. 6, 2004

(65) Prior Publication Data

US 2005/0145782 A1    Jul. 7, 2005

(51) Int. Cl.
*G02B 27/28* (2006.01)
*G02B 27/40* (2006.01)

(52) U.S. Cl. ............ 250/225; 250/201.5; 369/13.29

(58) Field of Classification Search ............ 250/225, 250/555, 570, 201.5; 369/13.29, 13.31, 110.01, 369/112.16
See application file for complete search history.

(56) References Cited

U.S. PATENT DOCUMENTS

2002/0088922 A1*  7/2002  Schmitz et al. .......... 250/206.1

* cited by examiner

*Primary Examiner*—Kevin Pyo
(74) *Attorney, Agent, or Firm*—Lowe Hauptman & Berner, LLP

(57) ABSTRACT

The present invention relates to an optical device which includes a first laser diode, a beam splitter, a first objective lens, a photo-detector, a second laser diode, a wedged plate beam splitter, a second objective lens and a collimator. The present invention deploys two independent transmitting paths. The retrieving paths share the beam splitter and the photo-detector commonly at the returning route.

2 Claims, 3 Drawing Sheets

OPTICAL PICKUP DEVICE EMITTING LINEAR POLARIZED LIGHT WITH A 45 DEGREE PHASE DIFFERENCE

BACKGROUND OF THE INVENTION

1. Field of the Invention

The present invention generally relates to an optical pickup device. There is 90 degree phase shift between linear polarization light from an laser diode reflected by an optical disk, which feedback to the original laser diode and linear polarization light from the original laser diode.

2. Background Description

FIG. 1 shows all components in an ordinary optical disk system. At first, laser diode 11 emits a p-type linear polarized light to polarized beam splitter 12. Through polarized beam splitter 12 and quarter wave plate 13, the light becomes circular polarized light to optical disk 16. Corrected by collimator lens 14 and objective lens 15, the light reflected by optical disk 16 comes back with original optical path. That is to say, through objective lens 15 and collimator lens 14, the reflected light with left-hand circular polarization enters into quarter wave plate 13 and polarized beam splitter 12. Finally, the light with s-type linear polarization enters to photodetector 17.

In this optical path with disk signal from optical disk, there are few signals which feedback to laser diode 11 by the property of polarized beam splitter 12. The partial signa with p-type linear polarization through polarized beam splitter 12 enters the laser diode 11. It makes intensity noise and influences the original p-type polarized light from laser diode 11. In FIG. 2, the photodetector 17 detects the related intensity noise which makes the bad influences of precision of detecting signals.

According to the defect of used optical pickup system, this invention has been implemented an optical pickup system and its optical path by the optical property to reduce the signal intensity noise and increase the precision of detecting signal, which can improve the defect of used optical pickup system.

SUMMARY OF THE INVENTION

It is therefore an object of the present invention to reduce the signal intensity noise and to increase the precision of detecting signal to improve the defect of used optical pickup system, the invention of optical pickup head includes laser diode 11 which emits an original polarized light with 45 degree phase angle, polarized beam splitter 12 which reflects the original polarized light to circular polarized light and passes through reflective light with left-hand circular polarized light, a collimator which makes the circular-polarized light to parallel light, an objective lens which focus the circular-polarized light to disk to let the reflective light which has one signal from optical disk and one photodetector which detect the relative signal. In this invention, the polarized beam splitter can produce one feedback light with −45 degree phase angle to laser diode, which can has one phase shift 90 degree between feedback light and original linear polarized light.

BRIEF DESCRIPTION OF THE DRAWINGS

The foregoing and other objects, aspects and advantages will be better understood from the following detailed description of a preferred embodiment of the invention with reference to the drawings, in which.

The followings are the list of detailed legends presented in the present invention.

DETAILED DESCRIPTION OF A PREFERRED EMBODIMENT OF THE INVENTION

The following is a description of the present invention. However, other than the detailed description, the present can also be widely implemented in other embodiment, and the scope of the present invention is not limited and is based on the future patent scope.

Figure 1:
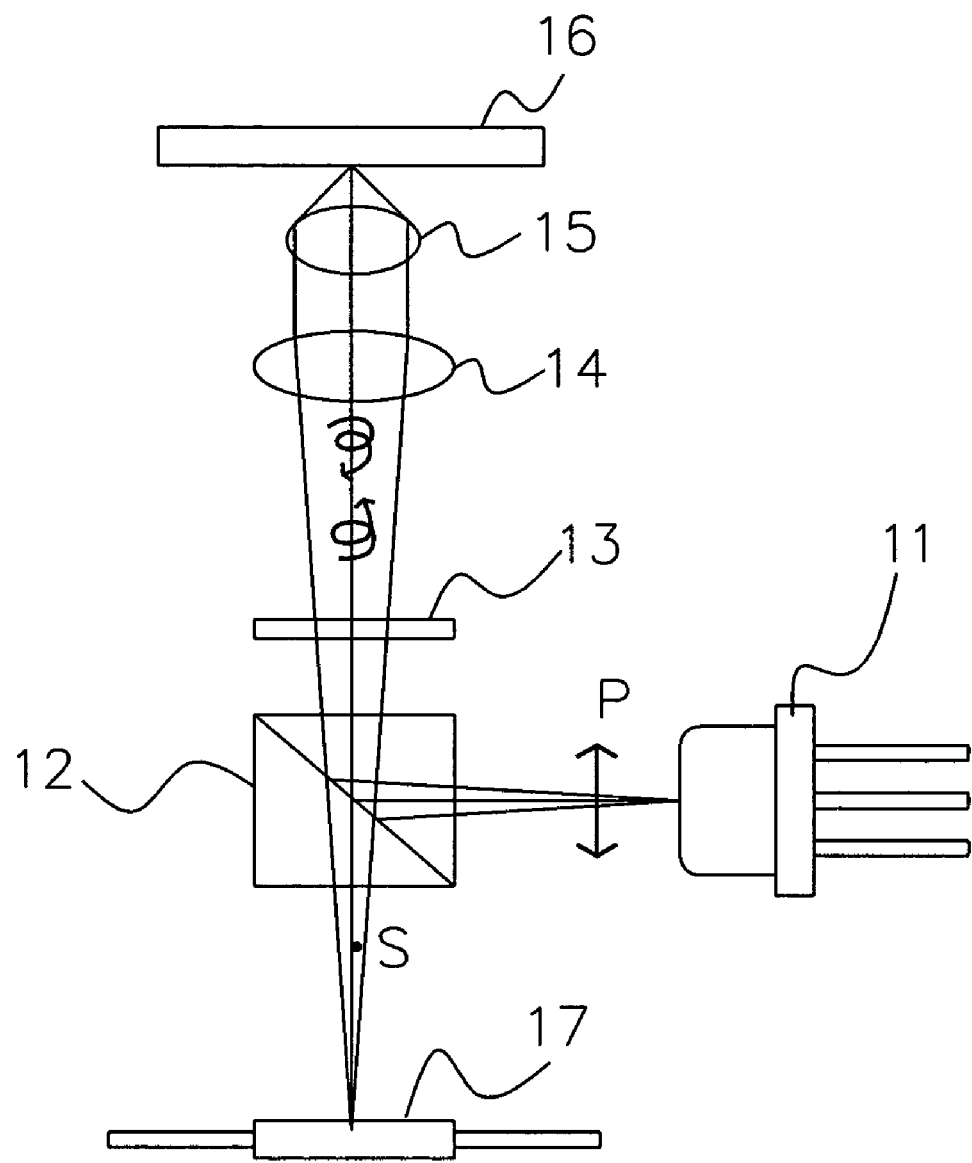
FIG. 1 presents prior known optical pickup head.
Figure 2:
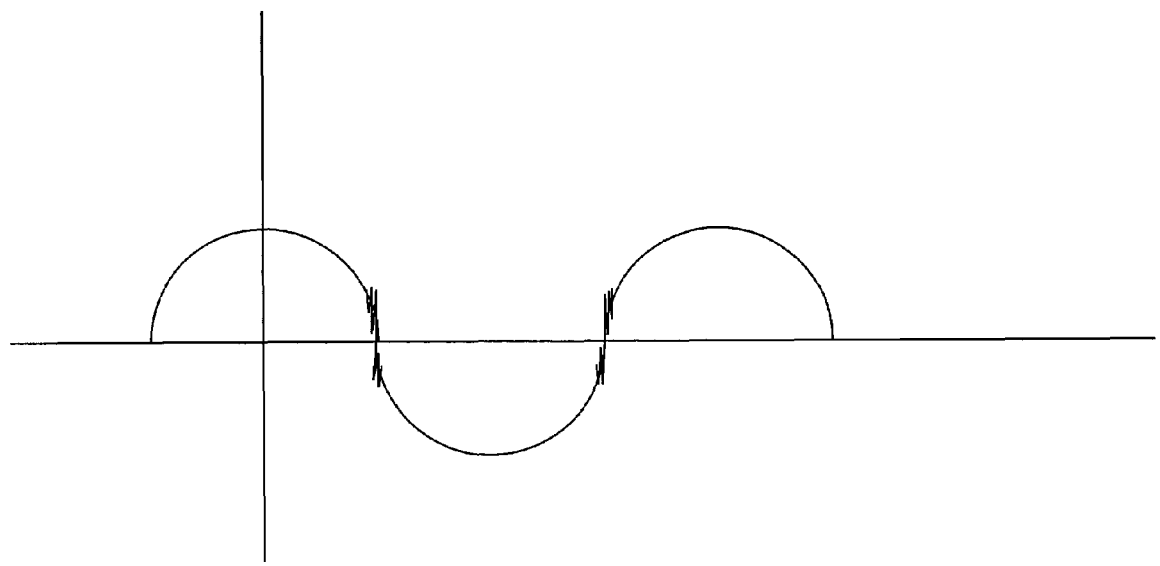
FIG. 2 shows noise contained in the feedback signals spectrum.
Figure 3:
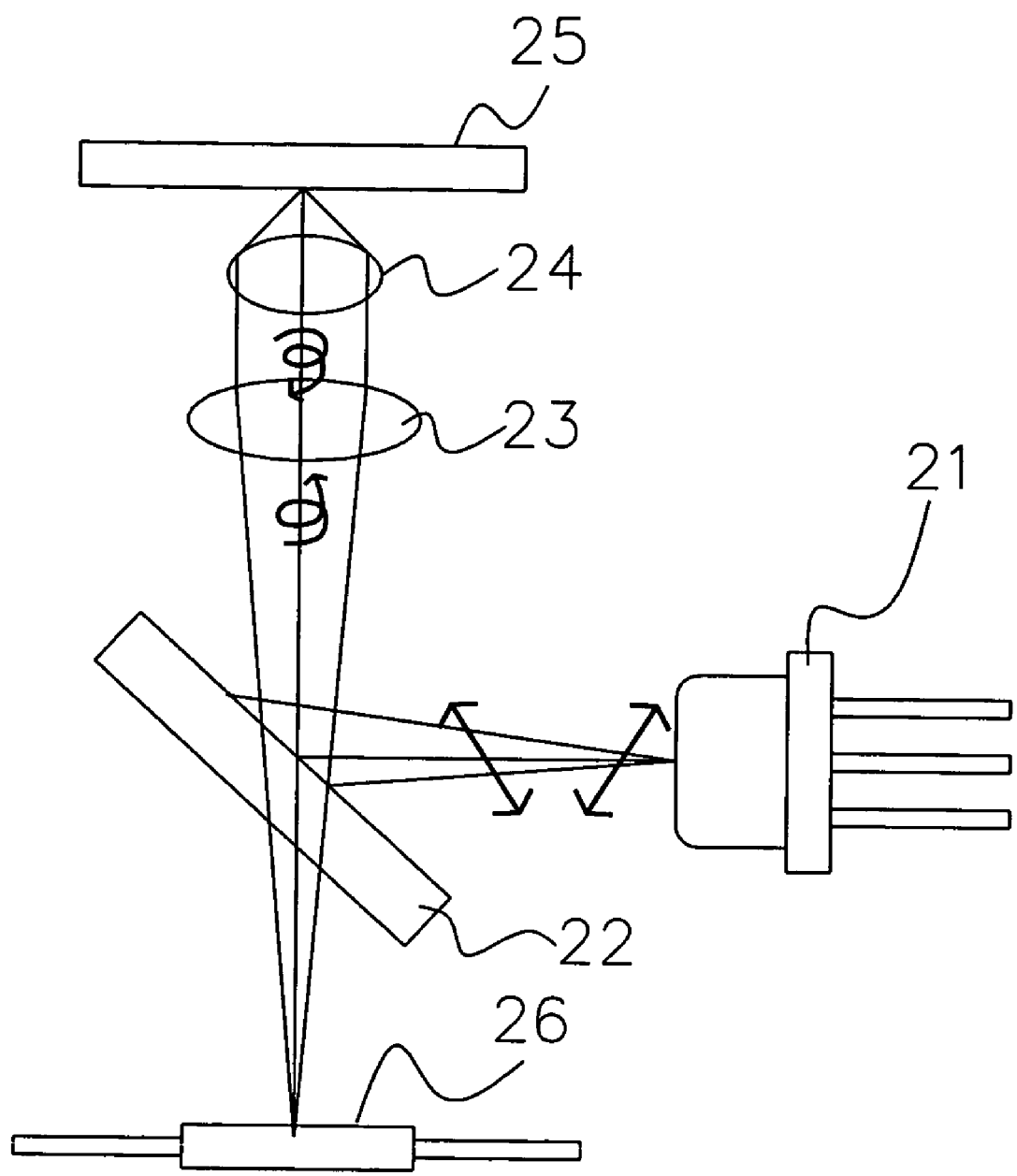
FIG. 3 shows the optical pickup head of the present invention.

A preferred embodiment according to the invention will be described hereunder with reference to FIGS. 1 to 3.

At first, laser diode 21 emits the linear polarized light with 45 phase angle to polarized beam splitter 22. By effect of separating and reflecting light of polarized beam splitter 22, the emitting light becomes right-hand circular polarized light to collimator 23. The light passing through the collimator 23 focuses on optical disk 25 by an objective lens 24. The reflective light with left-hand circular polarization by optical disk 25 is reflected with original optical path from objective lens 24 and collimator 23 to polarized beam splitter 22. The light is changed the polarization from left-hand circular polarization to linear polarization by passing through polarized beam splitter 22 to photodetector 26.

From this optical path which contains optical disk signal, there are few signals light which feedback to laser diode 22 because of the property of polarized beam splitter 22. But the feedback light with −45 degree phase angle increases the 90 degree phase shift compared with original light with +45 degree phase angle, the intensity noise can be removed.

However, the influence of yield rate of making optical component, (like beam splitter, collimator, objective lens and laser diode) can change the optical property of optical component. The foregoing phase shift can not be 90 degree by influence of yield rate. When it existing a phase shift in optical system, the intensity noise can still be reduced.

According to real operation and the existent optical component testing, in this invention, there is a tolerance +/−30 degree with 90 degree.

In this invention, the non-polarized beam splitter or some composed of polarized beam splitters can be used in place of polarized beam splitter. In this invention, it can reduce the specific optical component, like quarter wave plate which reduce the noise and increase the precision of detecting optical signal and to reduce the cost.

According to the foregoing description, this invention has one kind of method to reduce the signal intensity noise and increase the precision of detecting signal in optical pickup head system.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

The invention claimed is:

1. An optical pickup head device comprising:

a laser diode capable of emitting linear polarized light with 45 degree phase angle difference;

a polarized beam splitter for transforming said linear polarized light into right-hand circular polarized light and further bypassing a left-hand circular polarized light;

a collimator for aligning said right-hand circular polarized light in parallel;

an objective lens for focusing said right-hand circular polarized light onto an optical disk, said right-hand circular polarized light further carrying out signals from said optical disk; and a photodetector for detecting said signals.

2. The optical pickup head device as claimed in claim 1, wherein said polarized beam splitter generates −45 degree phase angle difference for feeding back a feedback polarized light to said laser diode, in this case, said feedback polarized light will not interfere said linear polarized light since there is a phase angle difference from 45 to −45.

* * * * *